Patented Aug. 29, 1939

2,170,833

UNITED STATES PATENT OFFICE 2,170,833

DI-PHENYL MONO-ORTHO-CHLORPHENYL PHOSPHITE

Clarence L. Moyle, Midland, Mich., assignor to The Dow Chemical Company, Midland, Mich., a corporation of Michigan No Drawing. Application November 1, 1937, Serial No. 172,163

1 Claim. (Cl. 260—461)

This invention concerns certain new organic compounds, viz., mixed triaryl phosphites having the general formula:

wherein R represents a phenyl or halo-phenyl radical and $R_1$ represents an aromatic radical other than R.

The new compounds herein disclosed are useful as plasticizers in nitrocellulose, cellulose acetate, and cellulose ether, e. g., ethyl cellulose, compositions. They are compatible with such cellulose derivatives, substantially non-volatile at room temperatures, soluble or miscible in the usual solvents or solvent mixtures for dissolving cellulose derivatives, and do not readily decompose or become discolored. Cellulose derivative compositions plasticized with the aforesaid new compounds are suitable for use in the preparation of artificial leather, lacquers, Celluloid, films, and molded plastics, as well as for the other uses to which cellulose derivative compositions are ordinarily put.

The new phosphites having the above general formula may be prepared by reacting a phosphorus trihalide with phenol or a halophenol, e. g., o-chlorophenol, p-bromophenol, 2.4-dichlorophenol, etc., to form a corresponding aryl phosphorous acid halide and thereafter reacting the latter with a different phenolic compound, e. g., ethylphenol, cyclohexylphenol, xenol (i. e., phenylphenol), etc. If desired, the order in which these reactions are carried out may be reversed, i. e., the phosphorus trihalide may first be reacted with the phenolic compound other than phenol or a halophenol to form the corresponding aryl phosphorous acid halide and the latter may then be reacted with phenol or a halophenol to obtain the desired neutral phosphite product.

Each of the above reactions is carried out by heating a mixture of the necessary reactants to a temperature at which hydrogen halide is evolved. The reactions are preferably carried out at the lowest convenient reaction temperatures, usually below 200° C.

The first of the above mentioned reactions may be carried out to form a mono-aryl phosphorous acid dihalide or a diaryl phosphorous acid monohalide as principal product. When a mono-aryl phosphorous acid dihalide is desired, at least one mol, and preferably between 3 and 6 mols, of phosphorus trihalide is employed in the reaction per mol of the phenolic reactant since there is a pronounced tendency for the aryl phosphorous acid dihalide initially formed during the treatment to react further with formation of the corresponding diaryl phosphorous acid mono-halide and possibly some triaryl phosphite. This same tendency to over-react is noted in carrying the reaction out for the formation of a diaryl phosphorous acid monohalide and to counteract this tendency we employ at least one-half mol, preferably between 1 and 3 mols, of phosphorus trihalide per mol of phenolic reactant in preparing such diaryl phosphorous acid monohalide.

For the reasons just given, the intermediate aryl phosphorous acid halide is usually formed along with one or more closely related by-products. If desired, it may be separated and purified by distillation before carrying out the successive reaction with a different phenol to form the desired mixed triaryl phosphite product, in which case the latter may be formed as the only organic product of the final reaction. In practice, however, it is more convenient merely to distill unreacted phosphorus trihalide from the impure intermediate aryl phosphorous acid halide, add the necessary proportion of the second phenol, and continue the reaction as hereinbefore described to obtain the final product. The latter consists largely of a single mixed triaryl phosphite having the general formula hereinbefore presented, but may contain a minor proportion of a second mixed triaryl phosphite as well as some symmetrical triaryl phosphite formed by over-reaction of one of the phenol reactants with phosphorus trihalide in the initial stage of the process. Such impure mixed phosphite product comprising other closely related compounds is usually a permanent liquid at room temperature, adapted to most uses for which the pure compound would be suitable. It is, therefore, a commercially valuable product. When desired, the individual phosphites contained in such product can usually be separated by fractional distillation.

In carrying out the invention, phosphorus trichloride is usually employed as the phosphorus trihalide reactant, although phosphorus tribromide and phosphorus tri-iodide may be used, the general procedure being the same in any case.

The phenolic reactants employed in preparing mixed triaryl phosphites of the present class may contain substituents such as halogen, alkyl, alkoxy, aryl, etc., which are non-reactive with a phosphorus trihalide under the conditions employed in which case the correspondingly substituted triaryl phosphites will be obtained.

The following examples illustrate several ways in which the principle of my invention has been applied but are not to be construed as limiting the invention:

Example 1

A mixture of 1650 grams (12 mols) of phosphorus trichloride and 680 grams (4 mols) of o-phenylphenol was heated at 74°–78° C. for 2 hours, hydrogen chloride being evolved during the reaction. When the reaction was complete, the excess phosphorus trichloride was distilled off, 921 grams being recovered. The crude aryl phosphorous acid chloride product was cooled to a temperature of approximately 20° C. and 752 grams (8 mols) of phenol added. The temperature was gradually raised to 155° C. over a period of 8 hours until the evolution of hydrogen chloride gas had ceased. The mixture was neutralized by addition of 16 grams of anhydrous sodium carbonate and the phosphite product recovered by fractional distillation. There was obtained di-o-xenyl mono-phenyl phosphite, a pale-yellow viscous liquid boiling at 308°–327° C. under 9 millimeters pressure, and having a specific gravity of 1.201 at 25/25° C. and an index of refraction, $$n_D^{25}=1.6356$$

Example 2

A mixture of 514 grams (4 mols) of o-chlorphenol and 1650 grams (12 mols) of phosphorus trichloride was heated at 25°–79° C. for 4 hours, during which time hydrogen chloride was evolved. Upon completion of the reaction, excess phosphorus trichloride was distilled from the mixture. The crude o-chlor-phenyl phosphorous acid dichloride was cooled to room temperature and 752 grams (8 mols) of phenol added. The temperature was gradually raised to 164° over a period of 9 hours, when reaction was complete. Anhydrous sodium carbonate was added to neutralize the reacted mixture and the phosphite product recovered by fractional distillation. There was obtained di-phenyl mono-o-chlorphenyl phosphite, a colorless mobile liquid boiling at 238°–246° C. under 6 millimeters pressure and having a specific gravity of 1.159 at 25/25° C. and an index of refraction, $$n_D^{25}=1.5932$$

Example 3

A mixture of 825 grams (5.25 mols) of p-tertiary-butylphenol and 1650 grams (12 mols) of phosphorous trichloride was heated at 15°–41° C. for 1½ hours as in Example 1. Excess phosphorus trichloride was distilled from the reaction mixture and 780 grams (8.3 mols) of phenol was added at approximately 15° C. The temperature was gradually raised to 164° C. over a period of 9 hours, after which 16 grams of anhydrous sodium carbonate was added to neutralize the reaction mixture, and the latter was then fractionally distilled. There was obtained di-(p-tertiarybutylphenyl) mono-phenyl phosphite, a yellow viscous liquid distilling at approximately 272°–282° C. under 7 millimeters pressure and having a specific gravity of 1.124 at 25/25° C. and an index of refraction, $$n_D^{25}=1.5562$$

Example 4

A mixture of 376 grams (4 mols) of phenol and 1650 grams (12 mols) of phosphorus trichloride was heated at 28°–84° C. for 2½ hours as in Example 1. Excess phosphorus trichloride was distilled from the reacted mixture, 864 grams (8 mols) of mixed cresols added at a temperature of 30° C., and the temperature gradually raised to 163° C. over a period of 9 hours. The reacted mixture was neutralized and the phosphite product recovered by fractional distillation. There was obtained di-tolyl mono-phenyl phosphite, a colorless mobile liquid boiling at approximately 225°–238° C. under 9 millimeters pressure having a specific gravity of 1.142 at 25/25° C. and an index of refraction, $$n_D^{25}=1.5792$$

Other substituted triaryl phosphites of the present class may be prepared by reacting a phosphorus trihalide successively with:—(1) o-brom-phenol and p-ethyl-phenol to form di-(p-ethyl-phenyl) mono-o-brom-phenyl phosphite; (2) phenol and carvacrol to form di-carvacryl mono-phenyl phosphite; (3) o-methoxy-phenol and 2,4-dichlorphenol to form di-(o-methoxy-phenyl) mono-(2,4-dichlorphenyl) phosphite; (4) m-brom-phenol and 2,4-dimethyl phenol to form di-(2,4-dimethyl-phenyl) mono-m-brom-phenyl phosphite; (5) beta-naphthol and p-chlorphenol to form di-(beta-naphthyl) mono-p-chlorphenyl phosphite; (6) p-phenylphenol and o-chlorphenol to form di-p-xenyl mono-o-chlorphenyl phosphite; (7) phenol and creosol to form di-(3-methyl-6-methoxy-phenyl) mono-phenyl phosphite; (8) o-cyclohexyl-phenol and m-chlorphenol to form di-(o-cyclohexylphenyl) mono-m-chlorphenyl phosphite; etc.

Other modes of applying the principle of my invention may be employed instead of those explained, change being made as regards the materials employed, provided the ingredients stated by the following claim or the equivalent of such stated ingredients be employed.

I therefore particularly point out and distinctly claim as my invention:

Di-phenyl-mono-ortho-chlorphenyl phosphite, a colorless mobile liquid distilling at approximately 238°–246° C. under 6 millimeters pressure, having a specific gravity of 1.159 at 25/25° C. and having the formula:

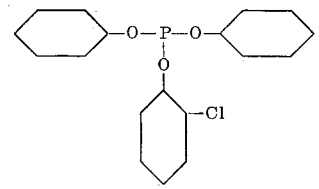

CLARENCE L. MOYLE.